(No Model.)

P. F. MORONEY.
BUTTER AND LARD CUTTER.

No. 260,310. Patented June 27, 1882.

Witnesses:
J. W. Garner
W. S. D. Haines

Inventor:
Patrick F. Moroney,
Howard G. Snow,
his Attorney

N. PETERS. Photo-Lithographer, Washington, D. C.

UNITED STATES PATENT OFFICE.

PATRICK F. MORONEY, OF RONDOUT, NEW YORK.

BUTTER AND LARD CUTTER.

SPECIFICATION forming part of Letters Patent No. 260,310, dated June 27, 1882.

Application filed March 6, 1882. (No model.)

*To all whom it may concern:*

Be it known that I, PATRICK F. MORONEY, a citizen of the United States, residing at Rondout, in the county of Ulster and State of New York, have invented certain new and useful Improvements in Implements for Cutting Butter and Lard, of which the following is a specification, reference being had therein to the accompanying drawings.

My invention relates to a new article of manufacture; and it consists of a knife for cutting and handling butter, lard, tallow, or any like substance, the construction of which will be hereinafter fully set forth and described.

Figure 1:
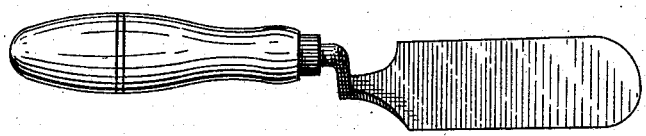
Figure 2:
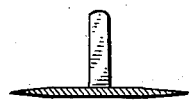

Figure 1 is a perspective view of the knife, and Fig. 2 shows a cross-sectional view of the blade.

The metal portion, or the blade and shank, is formed from an elongated plate of proper dimensions to forge and finish up a blade and shank of the desired proportions and strength. The blade is flat and of equal thickness its entire length. The edges are beveled equally upon both sides, so that the cutting-edges are formed centrally between the upper and lower parallel sides of the blade. The end is rounded and its edge is beveled in the same manner as the parallel edges before described. The advantages secured by this mode of beveling the sides equally to form the cutting-edges are that the knife when it enters the substance to be cut will displace it equally above and below the blade, and will enter straight without tendency to turn in either direction from the line of entrance. It will also enter the substance readily in any direction. Another advantage is that the substance handled will not slip off the blade so easily as if it was convexed upon its upper side. The shank has an offset of proper length above the blade to enable the blade to pass close to the sides of any receptacle from which it may be desired to remove the whole or a portion of the contents. Above the offset the shank is usually shaped and fitted to a handle of any wished-for material. If, however, a stronger and more durable handle is desired, sufficient metal remains of the plate above the offset to form a shapely and strong handle of proper size. By the use of this knife it is easy to cut and handle butter, lard, and like substances in a much cleaner and quicker manner than by any method now in use.

What I claim is—

A new article of manufacture consisting of a knife for cutting and handling lard, butter, tallow, and like substances, the blade of which is of uniform thickness having parallel edges beveled equally upon both sides its entire length, whereby the cutting-edges are formed centrally between the upper and lower parallel sides of the blade, and further provided with a bent shank adapted to permit the blade to pass close to the sides of the substance or its receptacle, and to secure additional leverage in detaching the substance cut, substantially as shown and described.

In testimony whereof I hereby affix my signature in presence of two witnesses.

PATRICK F. MORONEY.

Witnesses:
JOHN A. MULDOON,
EDWIN D. BRANDOW.